United States Patent Office 3,197,401
Patented July 27, 1965

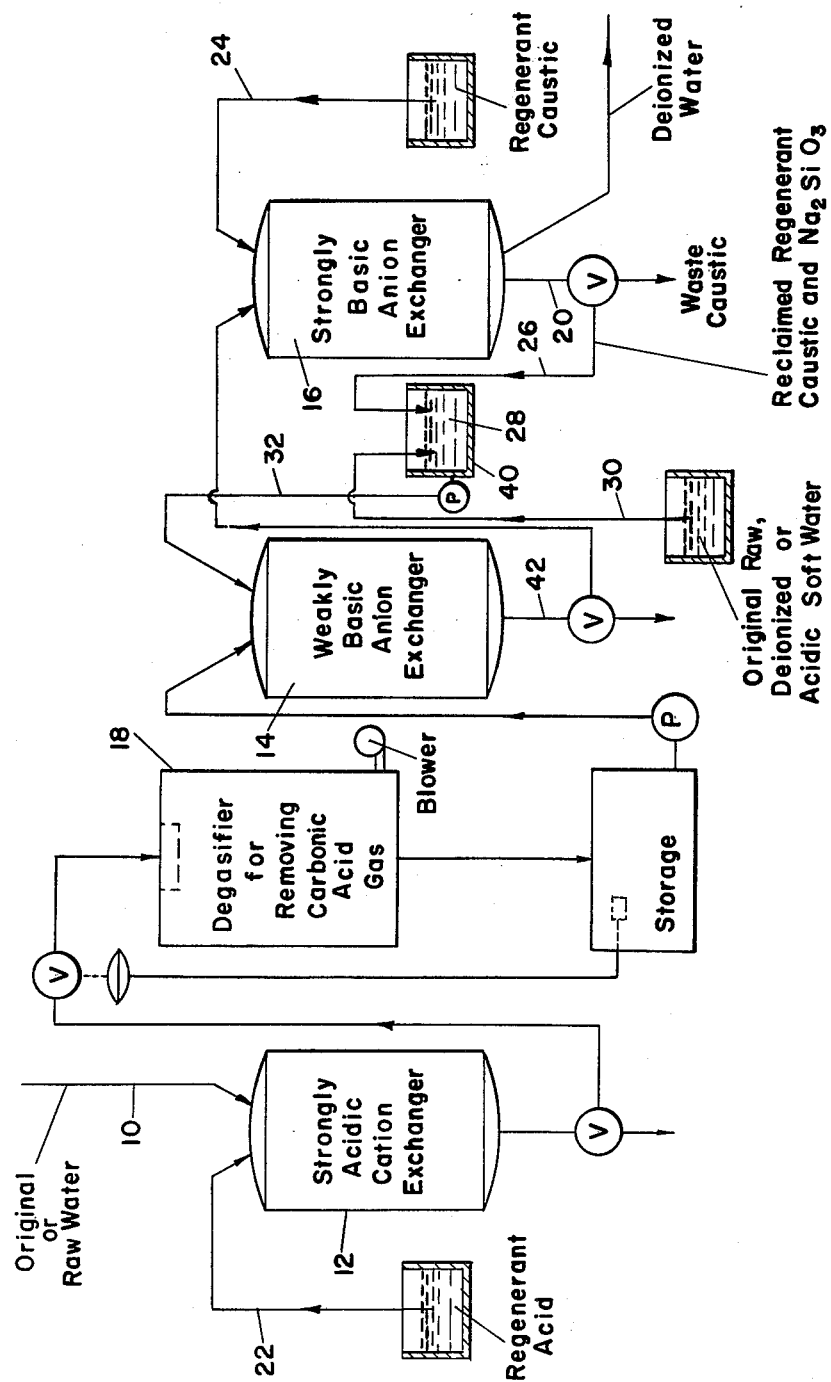

3,197,401
METHOD FOR REGENERATING WEAKLY BASIC ANION EXCHANGE RESIN
Yoshinori Arai, Kamakura, Japan, assignor to Rohm & Haas Company, Philadelphia, Pa., a corporation of Delaware
Filed Dec. 27, 1963, Ser. No. 331,350
10 Claims. (Cl. 210—30)

This invention relates to the deionization of water by treating it with a sequence of one or more acidic cation exchange resins followed by weakly basic and then strongly basic anion exchange resins. It has particular reference to an improvement in the regeneration of the weakly basic anion exchange resin with the effluent caustic which has been used to regenerate the strongly basic anion exchange resin, and which otherwise would be discarded as waste.

In a typical water deionization system, such as the three bed apparatus depicted in the accompanying schematic diagram, raw water is first passed, as indicated at 10, through a strongly acid cation exchanger 12 to remove such cations as the calcium, magnesium and sodium ions, which generally are present, by exchanging them for hydrogen. The salts of these cations are thus converted to their respective acids. Silicates in the water are converted to silicic acid. By passing these products through anion exchangers 14 and 16 these various acids are removed, as will be explained below.

The effluent from the cation exchange treatment also contains carbonic acid which likewise is removed. If done by mechanical aeration, the succeeding anion exchangers are relieved of the burden which this additional influent acid concentration would impose. It is thus preferable to use a degasifier or decarbonator 18 either before the weakly basic anion exchange resin unit 14 (as shown in the drawing), or between that unit and the succeeding strongly basic anion exchanger resin unit 16. Since the weakly basic anion exchange resin does not absorb any appreciable quantities of $CO_2$ or carbonic acid, it is a matter of choice whether to locate the decarbonator in the system before or after the weakly basic unit, the important thing being to incorporate it ahead of the strongly basic anion exchanger. This will assure that the latter's ion exchange capacity is not used up to any appreciable degree in the removal of the carbonic acid, consequently avoiding the necessity for increasing the amount of caustic required for its regeneration.

The effluent from the cation exchange unit, whether or not it has already been passed through a degasifier, next goes into the weakly basic anion exchanger where chlorides and sulfates are removed from the water. The effluent then goes through the strongly basic anion exchange unit where the silicic acid and traces of $CO_2$ are adsorbed. The last named unit, incidentally, may consist wholly of strongly basic anion exchange resins or, following accepted optional commercial practice, may consist of a mixed bed of strongly basic anion and acidic cation exchange resins.

The cation exchanger, which typically may be a sulfonic type resin such as Amberlite IR-120, is regenerated with a mineral acid as indicated at 22 in the drawing. Optionally, the cation exchanger can be a two bed unit in series, the first bed consisting of a carboxylic type resin such as Amberlite IRC-50, followed by a second bed of Amberlite IR-120. The weakly basic anion exchanger, which typically may be a polyamine type resin such as Amberlite IR-45, may be regenerated with sodium carbonate. The strongly basic anion exchanger, which typically may be a quaternary ammonium anion exchange resin such as Amberlite IRA-400, may be regenerated with sodium hydroxide as indicated at 24. All of these resins, incidentally, are commercially available products manufactured by the Rohm & Haas Company, Philadelphia, Pa., U.S.A.

The amount of caustic soda required for regenerating the strongly basic anion exchanger 16 generally is a relatively important factor, costwise, in the entire process. It is not unusual, for example, to require more than 4 to 6 lbs. of caustic soda per cu. ft. of anion exchange resin, and this makes the operating cost rather high particularly in view of the capacity realized. For this reason, one of the most important prior art improvements to this general process has been the use of a portion of the effluent waste caustic which exits at 20, passing it through piping as indicated at 26 to regenerate the weakly basic anion exchange resin 14 in lieu of the soda ash heretofore used for that purpose. This double use of the caustic regenerant has made the operation of such three (and more) bed units much more economical than had been possible before that technique was developed.

The described prior art system of deionization and resin regeneration has been generally satisfactory in the sense that it has made possible the most useful and economical treatment of boiler feed water and the like which has heretofore been known. By that system water hardness is reduced to a minimum, the bicarbonate or carbonate alkalinity is reduced to a minimum, the carbon dioxide content in the stream is reduced to prevent condensate system corrosion and to prevent carryover from the boiler, and silica is reduced to prevent the formation of silica scale in the boiler. This last is particularly important in the case of steam turbines, a very critical problem in the operation of power plants because such deposits reduce the efficiency of the turbines and make it necessary to shut the turbines down for a descaling operation.

Shutdowns of power plants are expensive since the plants lose their capacity or the use of spare units is made necessary. Prevention of silica deposits in the turbines can only be accomplished by reducing the amount of silica in the steam which feeds the turbines. This in turn requires the manufacture of low concentrations of silica in the concentrated boiler salines inasmuch as silica in the steam is a direct function of silica in the boiler salines. Such low concentrations can be partly attained by increased boiler blowoff. But in many cases the make-up feedwater may contain such high amounts of silica that the blowoff becomes excessive. Then treating the feedwater to reduce its silica becomes essential.

At least three prior art methods of silica removal are known and are aptly described in U.S. Patent 2,807,582. One is the deionization or demineralization treatment described above; a second is a hot lime zeolite treatment; and a third involves a cold process split stream hydrogen-sodium zeolite plant, followed by a degasifier treatment and then treatment by anion exchange units in the hydroxide form to convert the anions in the effluent into sodium hydroxide form which is partially neutralized with acid to control the water's pH before going into a boiler. Such methods, although possibly highly effective for the purpose intended, are made unnecessary by the present invention. In fact, instead of merely getting rid of all the silica that is removed from the raw water by the strongly basic anion exchange resin, at least a good portion of it is put to useful work. This is accomplished by salvaging the $Na_2SiO_3$ which is removed from the strongly basic anion exchange resin by the NaOH regeneration treatment, and using the silicate (in order to take advantage of its basicity values) in regenerating the weakly basic anion exchange resin as will be explained below.

As pointed out above, the prior art's double use of the caustic regenerant has made possible the most economical method of water treatment heretofore known.

But one major difficulty exists with that technique which has been a drawback to its attainment of actual efficiency commensurate with theoretical values. As the waste caustic from the strongly basic exchanger 16 is sent into the weakly basic exchanger 14 some of its alkalinity is consumed, resulting in a pH decrease of the influent to exchanger 14. The regeneration efficiency of the weakly basic anion exchange resin being quite good, all the alkalinity in the waste regenerant is consumed and the silica present as sodium silicate in the reclaimed caustic separates as colloidal silica or as a precipitate. The precipitated material plugs or coats the resin particles and the interstices between the particles as well as the distributor devices that feed the liquid. The result is that further regeneration becomes impossible as the caustic is barred from passing through the bed of resin uniformly. The resin bed may become so plugged that flow of the caustic may cease altogether, thereby preventing regeneration of the bed.

The present invention avoids these difficulties. By diluting the regenerant caustic, as at 28, with the original raw, deionized or acidic soft water 30, then passing the diluted regenerant is indicated at 32 into the weakly basic anion exchanger 14, the silica does not coagulate or precipitate. This is so even after the pH is decreased when the regenerant passes through the weakly basic anion exchange resin. Instead, the $Na_2SiO_3$ present in the regenerant stream 32 serves to help regenerate the weakly basic anion exchange resin, thereby reducing the amount of caustic necessary for that purpose. The degree of dilution is controlled so as to regulate the silica concentration and keep it below about 1%, thereby assuring that the silica will not separate out of the solution as a coagulate. Naturally, the amount of the diluent which must be added will vary with the concentration of the caustic and the amount of silica in the waste caustic effluent from exchanger 16, but it is a simple matter for the operator to regulate this by running periodic analytical checks on that effluent before adding the diluent.

As a general practice it is customary, for maximum regeneration efficiency, to use a 2 to 10% NaOH solution as the regenerant caustic which passes through piping 24 into the strongly basic anion exchanger 16. The waste liquid which exits at 20 usually contains some unreacted NaOH plus $Na_2CO_3$ and $Na_2SiO_3$. Although the degasifier unit 18 is optional in the process, when utilized it will serve to minimize or eliminate the $Na_2CO_3$ so that essentially only $Na_2SiO_3$ and NaOH will be present.

A further explanation of the mechanism of the present invention may be in order at this point. It is known, that, as a rule, the weakly basic anion exchange resin 14, which absorbs only strongly acidic components, has a great affinity for $OH^-$ ions, and the regeneration of the resin may be completely accomplished even with an alkaline solution of low concentration. For the regenerant there may be used any alkaline solution such as caustic soda, ammonia water, sodium carbonate and sodium silicate. By contrast, the strongly basic anion exchange resin 16, which absorbs even such a weak acid as silicic acid, has a poor affinity for $OH^-$ ions. As a result, the alkali concentration of the regenerant must be kept high and, as the regeneration efficiency of the resin is poor (the maximum is about 50%), there remains a considerable amount of unreacted alkali in the effluent which exits at 20.

In accordance with the prior art practices, only a fraction of the waste caustic effluent 20 is usable to regenerate the weakly basic exchange resin 14 because of the danger of silica fouling that resin and the distributors in the ion exchange apparatus. Thus, it is generally necessary to supplement the waste caustic regenerant with fresh regenerant such as sodium carbonate. This additional expense has been eliminated by the present invention, and with far better regeneration results than heretofore.

By diluting the reclaimed regenerant caustic 26, e.g., in the mixing vat 40, with a diluent 30 as explained above, the $Na_2SiO_3$ in the regenerant effluent is employed to help regenerate the weakly basic anion exchange resin. In so doing, regeneration of that exchanger can be accomplished without adding fresh alkali to the regenerant which is obtained in the form of the reclaimed waste caustic 26. Because of this, moreover, another saving is effected. When the effluent from the weakly basic anion exchanger exits at 42 there is less alkalinity present which needs to be neutralized before it is discarded in the drainage system than heretofore was the situation, and thus a further economy is achieved by the present process in comparison with prior art methods.

The present invention may be illustrated and even more clearly understood by reference to the following examples:

*Example 1*

Water was treated which had an original composition of 300 p.p.m. of total cations as $CaCO_3$, 40% alkalinity, 180 p.p.m. of mineral acidity as $CaCO_3$, 30 p.p.m. of silica as $SiO_3$. It was passed through the strongly acidic cation exchanger 14 which was comprised of Amberlite IR–120 in the $H^+$ form. Next the water was sent through the degasifier 18 to remove the carbonic acid gas present. The resulting water, which was acidic soft water, contained 160 p.p.m. of mineral acidity as $CaCO_3$, 30 p.p.m. of silica and 5 p.p.m. of carbonic acid gas as $CO_2$.

This water was next passed through a weakly basic anion exchanger 14 comprised of Amberlite IR–45 in the $OH^-$ form, and then through a strongly basic anion exchanger 16 comprised of Amberlite IR–400 in the $OH^-$ form. The deionized water which resulted from this treatment had a specific resistance of 300,000 Ω cm. (25° C.) and a $SiO_3^-$ content of 0.1 p.p.m. (as $SiO_3$).

For the sake of comparison of the present invention with the prior art method (in which undiluted waste caustic regenerant is reclaimed and used to regenerate the weakly basic resin), two sets of resin columns were employed as above described for deionizing raw water. The two kinds of anion exchange resins in each set were then regenerated, one in accordance with the prior art and the other in accordance with the present invention.

(a) In accordance with the prior art, the Amberlite IRA–400 was regenerated with 5% NaOH solution, and the effluent was passed through the Amberlite IR–45. In the upper part of the latter resin column gelled material was generated and the rate of flow of the regeneration of the weakly basic resin became all but impossible to accomplish. Even after rinsing that resin with water for over 3 hours the purity of the deionized material did not increase over a specific resistance of 20,000 Ω cm. (25° C.).

(b) In accordance with the present invention, the Amberlite 400 was regenerated with a 5% NaOH solution and the effluent 26 was diluted by adding thereto deionized water 30 at the rate of 5 liters per 1 liter of effluent. The thus diluted effluent 32 was passed through the Amberlite IR–45. No gelation or precipitation occurred, and the regeneration was completely accomplished. After one hour of rinsing the Amberlite IR–45 with water, the purity of the deionized water obtained was shown by a specific resistance of 1,000,000 Ω cm. (26° C.). After two hours of rinsing the specific resistance was 300,000 Ω cm. (25° C.), and silica content was 0.1 p.p.m. (as $SiO_3$).

*Example 2*

Example 1(b) is repeated except for using raw water 30 instead of the deionized water, with the result that a water product of a comparable degree of deionization is obtained.

*Example 3*

Example 1(b) is repeated except for using acidic soft water 30 instead of the deionized water, with the result that a water product of a comparable degree of deionization is obtained.

*Example 4*

Example 1(b) is repeated except for using a mixed bed of a cation exchange resin in the $H^+$ form and a strongly basic anion exchange resin in the $OH^-$ form in lieu of the wholly strongly basic anion exchange resin bed. Regeneration of each resin is accomplished in accordance with conventional practices by separating the two resins and regenerating each separately, the cation exchange resin with a mineral acid and the anion exchange resin with NaOH. A water product of a comparable degree of deionization is obtained.

*Example 5*

Example 1(b) is repeated except for treating water having 100% alkalinity and for using Amberlite IRC-50, a carboxylic cation exchange resin in the $H^+$ form, in lieu of the Amberlite IR-120. A water product of a comparable degree of deionization is obtained.

*Example 6*

Example 1(b) is repeated except for using, instead of a single cation exchange resin, a combination of two cation exchange resins in series. The first is Amberlite IRC-50, a carboxylic cation exchange resin, and the second is Amberlite IR-120, a sulfonic cation exchange resin, both in the $H^+$ form. A water product of a comparable degree of deionization is obtained.

I claim:
1. In a process for deionizing water which consists essentially of passing water to be treated in contact with a strongly acidic cation exchanger, then passing the water in contact with a weakly basic anion exchanger, and next passing the water in contact with a strongly basic anion exchanger, the method of regenerating the weakly basic anion exchanger which comprises first passing caustic in contact with the strongly basic anion exchanger, collecting the effluent silica-containing waste caustic from the strongly basic exchanger and diluting at least a portion of that waste caustic with a diluent selected from the class consisting of untreated raw water, deionized water, and acidic soft water until the silica concentration in the effluent is below about 1%, then passing the thus diluted effluent in contact with said weakly basic anion exchanger so as thereby to regenerate the weakly basic exchanger.

2. The process of claim 1 in which the diluent is raw, untreated water.

3. The process of claim 1 in which the diluent is deionized water.

4. The process of claim 1 in which the diluent is acidic soft water.

5. The process of claim 1 in which the regenerant passed in contact with the strongly basic anion exchanger is a solution of from about 2 to about 10% sodium hydroxide.

6. The process of claim 1 in which the strongly basic anion exchanger is a quaternary ammonium anion exchange resin in the $OH^-$ form, the weakly basic anion exchange resin is a polyamine type resin in the $OH^-$ form, and the cation exchanger is a sulfonic type resin in the $H^+$ form.

7. The process of claim 1 in which the strongly basic anion exchanger is a quaternary ammonium anion exchange resin in the $OH^-$ form, the weakly basic resin is a polyamine type resin in the $OH^-$ form, and the cation exchanger is a carboxylic cation exchange resin in the $H^+$ form.

8. The process of claim 1 in which the strongly basic anion exchanger is a quaternary ammonium anion exchange resin in the $OH^-$ form, the weakly basic resin is a polyamine type resin in the $OH^-$ form, and the cation exchanger is composed of two units in series, a carboxylic acid cation exchange resin in the $H^+$ form followed by a sulfonic acid cation exchange resin in the $H^+$ form.

9. A method for regenerating a weakly basic anion exchange resin which comprises passing in contact with the resin a solution containing caustic and silica, said silica being present in amounts up to about 1%.

10. A method for regenerating a weakly basic anion exchange resin which comprises passing in contact with the resin a solution of caustic and silica which previously had been used to regenerate a strongly basic anion exchange column and which subsequently thereto had been diluted with a diluent selected from the class consisting of untreated raw water, deionized water, and acidic soft water until the silica concentration in the caustic solution had been reduced to less than about 1%.

References Cited by the Examiner

UNITED STATES PATENTS 2,606,870  8/52  Pemberton et al. _____ 210—37
2,926,110  2/60  Shimizu et al. _____ 127—46

OTHER REFERENCES

"Article" in Text, Ion Exchange Resins by Kunin and Meyers, Copyright 1950 by John Wiley and Sons, Inc. (pages 103–104 relied upon).

MORRIS O. WOLK, *Primary Examiner.*